「12) United States Patent
Joh

(10) Patent No.: US 10,621,985 B2
(45) Date of Patent: Apr. 14, 2020

(54) VOICE RECOGNITION DEVICE AND METHOD FOR VEHICLE

(71) Applicants: Hyundai Motor Company, Seoul (KR); Kia Motors Corporation, Seoul (KR)

(72) Inventor: Jae Min Joh, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 112 days.

(21) Appl. No.: 15/991,696

(22) Filed: May 29, 2018

(65) Prior Publication Data
US 2019/0130907 A1 May 2, 2019

(30) Foreign Application Priority Data
Nov. 1, 2017 (KR) .................. 10-2017-0144905

(51) Int. Cl.
G10L 15/00 (2013.01)
G10L 15/22 (2006.01)
(Continued)

(52) U.S. Cl.
CPC .............. G10L 15/22 (2013.01); G10L 15/05 (2013.01); G10L 15/1815 (2013.01);
(Continued)

(58) Field of Classification Search
CPC ......... G10L 15/26; G10L 17/22; G10L 15/22; G10L 15/00; G10L 2015/223; G10L 25/48; G10L 15/02; G10L 15/20; G10L 15/265; G10L 15/30; G10L 17/00; G10L 15/083; G10L 2015/228; G06F 3/167; G06F 17/289; G06F 3/0488; B66B 1/3415
See application file for complete search history.

(56) References Cited

U.S. PATENT DOCUMENTS 5,293,452 A * 3/1994 Picone .................. G10L 15/142
704/250
10,475,441 B2 * 11/2019 Lee ......................... G10L 25/51
(Continued)

FOREIGN PATENT DOCUMENTS

JP 2005017932 A 1/2005
KR 101537693 B1 7/2015

Primary Examiner — Edgar X Guerra-Erazo
(74) Attorney, Agent, or Firm — Mintz Levin Cohn Ferris Glovsky and Popeo, P.C.; Peter F. Corless

(57) ABSTRACT

A voice recognition device for a vehicle includes: an input device receiving a command and a negative interjection uttered by a user, converting the command into a first voice signal, and converting the negative interjection into a second voice signal; a storage device storing a negative context, an interjection context, and an acoustic model; and a control device receiving the first voice signal, detecting a first start point and a first end point of the first voice signal, receiving the second voice signal after the detection of the first start point and the first end point of the first voice signal, detecting a second start point and a second end point of the second voice signal, and recognizing the second voice signal based on at least one of the negative context, the interjection context, and the acoustic model when the reception of the first voice signal and the second voice signal is completed.

20 Claims, 8 Drawing Sheets

(51) Int. Cl.
*G10L 25/21* (2013.01)
*G10L 15/18* (2013.01)
*G10L 15/05* (2013.01)
G10L 25/87 (2013.01)

(52) U.S. Cl.
CPC .............. *G10L 25/21* (2013.01); *G10L 25/87* (2013.01); *G10L 2015/223* (2013.01)

(56) References Cited

U.S. PATENT DOCUMENTS

| | | | |
|---|---|---|---|
| 2002/0128838 A1* | 9/2002 | Veprek | G10L 13/033 704/258 |
| 2007/0198248 A1 | 8/2007 | Yasutaka | |
| 2010/0057465 A1* | 3/2010 | Kirsch | G01C 21/3629 704/260 |
| 2010/0121636 A1* | 5/2010 | Burke | G10L 15/265 704/233 |
| 2015/0371665 A1* | 12/2015 | Naik | G10L 25/78 704/248 |
| 2016/0148615 A1* | 5/2016 | Lee | G10L 15/22 704/275 |
| 2016/0232897 A1* | 8/2016 | Pereira | G10L 15/22 |
| 2016/0358598 A1* | 12/2016 | Williams | G10L 15/04 |
| 2017/0110116 A1* | 4/2017 | Tadpatrikar | G10L 15/22 |
| 2018/0090127 A1* | 3/2018 | Hofer | G10L 15/04 |
| 2018/0286390 A1* | 10/2018 | Sreedhara | G06F 16/34 |
| 2018/0350395 A1* | 12/2018 | Simko | G10L 15/065 |

\* cited by examiner

VOICE RECOGNITION DEVICE AND METHOD FOR VEHICLE

CROSS-REFERENCE TO RELATED APPLICATION

This application claims the benefit of priority to Korean Patent Application No. 10-2017-0144905, filed on Nov. 1, 2017 in the Korean Intellectual Property Office, the disclosure of which is incorporated in its entirety by reference as if fully set forth herein.

TECHNICAL FIELD

The present disclosure relates generally to a voice recognition device and method for a vehicle, and more particularly, to a voice recognition device and method for a vehicle capable of recognizing the input of a voice command.

BACKGROUND

Voice recognition systems have been used in a wide range of fields, providing various functions required by users. Voice recognition techniques may be implemented in electronic devices including voice input devices (for example, microphones). Such voice recognition techniques have recently replaced physical inputs of electronic devices, and are becoming an increasingly popular way to control the electronic devices by voice.

In general, voice recognition may be roughly divided into two operations, preprocessing and recognition. For example, a conventional voice recognition technology may analyze an input voice, extract features of the input voice, and measure similarity with a previously collected voice model database to convert the most similar extracted features into characters or commands. The user's voice often includes meaningless sounds such as ambient noise. Thus, the voice recognition system may determine the extracted voice recognition section.

For instance, when the user wakes up the voice input device using a voice start button or a call instruction, the voice input device (e.g., microphone) may be opened. Then, background energy may be used to estimate start and end points of the voice uttered by the user. When the end point of the uttered voice is detected, the voice input device may be closed.

The voice recognition system may analyze the voice through a preprocessing operation to extract features for voice recognition. The voice recognition system may compare the input voice with the voice database to output the most likely word(s) as a result of voice recognition.

In addition, the voice recognition system may convert the recognized result into sound, and notify the user by sound. Alternatively, the voice recognition system may notify the user by displaying the result.

However, when a user who is not skillful in the use of the voice recognition system is not acquainted with the recognizable vocabulary, the user may be inconvenienced due to uttering an incorrect command. As an example, if the a utters the command, "Starbucks at Gangnam station", but realizes the utterance of the wrong command, and then reutters "Ah no, it's not . . . ", a conventional voice recognition system may detect "Starbucks at Gangnam station" as an end point and then close the voice input device. Thus, the voice recognition system may retrieve information on "Starbucks at Gangnam station" and output the result. This may cause inconvenience by forcing the user to wait for retrieval of the unwanted information on "Starbucks at Gangnam station" prior to re-uttering a new command in order to acquire the user's desired information.

Alternatively, if the conventional voice recognition system recognizes the command "Starbucks at Gangnam station . . . Ah no, it's not . . . ", the system may fail to retrieve corresponding information as the command does not exist in the voice recognition system.

SUMMARY

The present disclosure has been made to solve the above-mentioned problems occurring in the related art while advantages achieved by the related art are maintained intact.

An aspect of the present disclosure provides a voice recognition device and method for a vehicle, allowing a user to cancel an input voice command when a negative word is recognized and to utter a new voice command again.

According to embodiments of the present disclosure, a voice recognition device for a vehicle includes: an input device receiving a command and a negative interjection uttered by a user, converting the command into a first voice signal, and converting the negative interjection into a second voice signal; a storage device storing at least one of a negative context, an interjection context, and an acoustic model; and a control device receiving the first voice signal, detecting a first start point and a first end point of the first voice signal, receiving the second voice signal after the detection of the first start point and the first end point of the first voice signal, detecting a second start point and a second end point of the second voice signal, and recognizing the second voice signal based on at least one of the negative context, the interjection context, and the acoustic model when the reception of the first voice signal and the second voice signal is completed.

The control device may receive the second voice signal within an arbitrary time interval after the first end point of the first voice signal.

The control device may detect a point in time at which background energy of the second voice signal is measured to be greater than or equal to a predetermined level, the detected point in time being the second start point of the second voice signal.

The control device may detect a point in time at which background energy of the second voice signal is measured to be less than a predetermined level, the detected point in time being the second end point of the second voice signal.

The control device may close the input device when the reception of the first voice signal and the second voice signal is completed.

The control device may determine that the negative interjection is recognized from the second voice signal when a recognition result of the second voice signal is greater than or equal to a threshold.

The control device may perform a primary search with respect to the command after the detection of the first end point.

The control device may stop the primary search and generate a feedback message that enables input of a new command when a recognition result of the second voice signal is greater than or equal to a threshold.

The control device may generate a result of the primary search and a message for determining the result when a recognition result of the second voice signal is greater than or equal to a threshold.

The control device may generate a result message corresponding to the new command when the recognition result of the second voice signal is greater than or equal to the threshold.

Furthermore, according to embodiments of the present disclosure, a voice recognition method for a vehicle includes: receiving a first voice signal converted from a command uttered by a user; detecting a first start point and a first end point of the first voice signal; receiving a second voice signal converted from a negative interjection uttered by the user after the detection of the first start point and the first end point of the first voice signal; detecting a second start point and a second end point of the second voice signal; and recognizing the second voice signal based on at least one of a negative context, an interjection context, and an acoustic model, which are previously stored in a storage device, when the reception of the first voice signal and the second voice signal is completed.

The receiving of the second voice signal may be performed simultaneously with a primary search with respect to the command.

The receiving of the second voice signal may be performed within an arbitrary time interval after the first end point of the first voice signal is detected.

The detecting of the second start point and the second end point of the second voice signal may include detecting a point in time at which background energy of the second voice signal is measured to be greater than or equal to a predetermined level, the detected point in time being the second start point of the second voice signal.

The detecting of the second start point and the second end point of the second voice signal may include detecting a point in time at which background energy of the second voice signal is measured to be less than a predetermined level, the detected point in time being the second end point of the second voice signal.

The recognizing of the second voice signal may include determining that the negative interjection is recognized from the second voice signal when a recognition result of the second voice signal is greater than or equal to a threshold.

The voice recognition method may further include stopping the primary search and outputting a feedback message that enables input of a new command when a recognition result of the second voice signal is greater than or equal to a threshold, after the recognizing of the second voice signal.

The voice recognition method may further include performing a secondary search with respect to the new command when the new command is input, after the outputting of the feedback message.

The voice recognition method may further include outputting a result of the primary search and a message for determining the result of the primary search when a recognition result of the second voice signal is greater than or equal to a threshold, after the recognizing of the second voice signal.

The voice recognition method may further include performing a secondary search with respect to a new command when the new command is input by the user, after the outputting of the result of the primary search and the message for determining the result of the primary search.

BRIEF DESCRIPTION OF THE DRAWINGS

The above and other objects, features and advantages of the present disclosure will be more apparent from the following detailed description taken in conjunction with the accompanying drawings.

Figure 1:
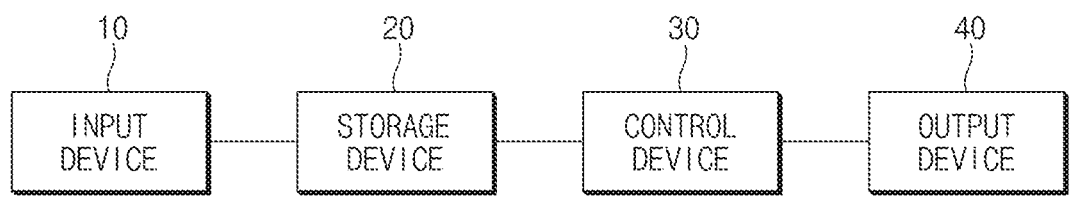
FIG. 1 illustrates the configuration of a voice recognition device for a vehicle, according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Teams such as first, second, A, B, (a), and (b) may be used to describe the elements in embodiments of the present disclosure. These teams are only used to distinguish one element from another element, and the intrinsic features, sequence or order, and the like of the corresponding elements are not limited by the teams. Unless otherwise defined, all teams used herein, including technical or scientific teams, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the team "and/or" includes any and all combinations of one or more of the associated listed items.

It is understood that the team "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control device. The team "control device" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control device in conjunction with one or more other components, as would be appreciated by a person of ordinary skill in the art.

Referring now to the presently disclosed embodiments, FIG. 1 illustrates the configuration of a voice recognition device for a vehicle, according to embodiments of the present disclosure.

As shown in FIG. 1, a voice recognition device for a vehicle, according to embodiments of the present disclosure, may include an input device 10, a storage device 20, a control device 30, and an output device 40.

The input device 10 may receive a command and an interjection uttered by a user. The input device 10 may convert the command and the interjection into a first voice signal and a second voice signal, respectively, and transmit the converted signals to the control device 30. The input device 10 may perform an operation based on various noise reduction algorithms for eliminating noise generated in receiving external audio signals. The input device 10 may be a microphone. Here, the interjection, also known as an exclamation, is a class of words to express instinctive surprise, emotion, call, response, and the like. In the present disclosure, the interjection includes a negative interjection. For example, the negative interjection, such as "no," "nope," "cancel," "again," "Ah no," "it's not," or slang, may be included.

The storage device 20 may store a negative context or an interjection context in order to recognize the negative interjection. In addition, the negative context or the interjection context may be stored by being converted into predetermined sequence of phonemes and pronunciations using Gragheme to Phoneme (G2P) conversion. The negative interjection is not limited to the aforementioned examples, and may be a word or sentence containing negative contents denying a command input to the input device 10. In addition, the storage device 20 may store a vocabulary tree and an acoustic model in order to recognize the received voice signals.

The storage device 20 may include a storage medium, such as a flash memory, a hard disk, a multimedia card micro type memory, a card type memory (e.g., SD or XD memory), a random access memory (RAM), a static random access memory (SRAM), a read-only memory (ROM), an electri-cally erasable programmable read-only memory (EEPROM), a programmable read-only memory (PROM), a magnetic memory, a magnetic disk, or an optical disk.

The control device 30 may control the operation of the voice recognition device. More specifically, when the user's voice is input to the input device 10, the control device 30 may determine the start and end of the voice, and perform voice recognition on the command and the interjection input to the input device 10. Details thereof will be provided with reference to FIG. 2.

Figure 2:
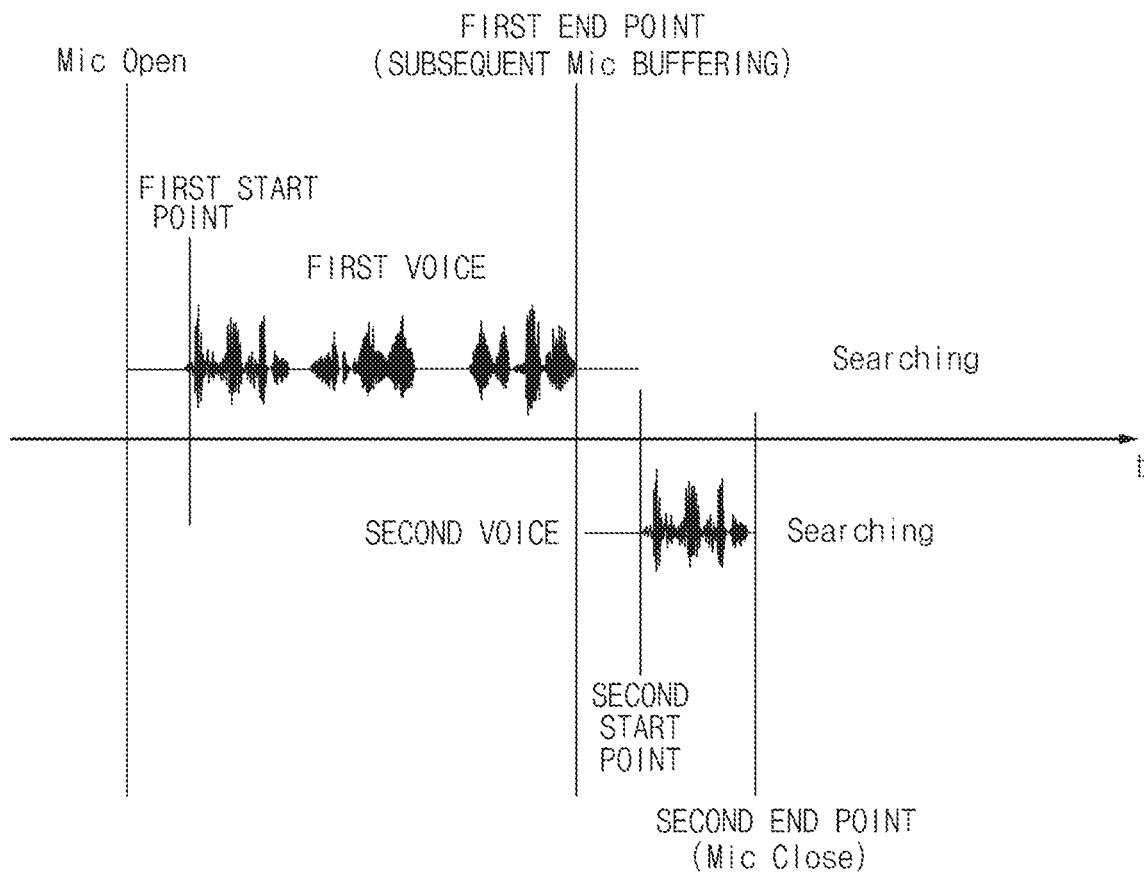
FIG. 2 illustrates background energy according to operation of a voice recognition device, according to embodiments of the present disclosure.

Referring next to FIG. 2, according to embodiments of the present disclosure, when the user presses a push-to-talk button provided in the interior of the vehicle, or a wake-up command is input to the input device 10, the control device 30 may open the microphone to receive the first voice signal and the second voice signal with respect to the command and the interjection. When the first voice signal and the second voice signal are received, background energy may be measured to be higher than or equal to a predetermined level, and this point in time may be detected as a first start point of the received first voice signal. According to embodiments of the present disclosure, a voice signal received at the first start point may be a voice signal with respect to the command.

In addition, the control device 30 may determine a case in which the background energy is measured to be lower than the predetermined level for a period of time shorter than a predetermined period of time as silence. In the case in which the background energy is measured to be lower than the predetermined level for a predetermined period of time or longer, a point in time at which the background energy is lowered may be detected as a first end point.

In addition, the control device 30 may measure the background energy even after the first end point is detected. In other words, the control device 30 may not close the microphone when the end point of the voice input is detected as in the prior art, but may keep receiving a voice signal even after the first end point is detected by setting a buffering time for an arbitrary time interval. Thus, when the user determines the utterance of a wrong command and utters an interjection containing the context of immediate cancellation, for example, when the user utters a negative interjection, the second voice signal may be received.

When the second voice signal is received after the first end point of the first voice signal is detected, the background energy may be measured to be greater than or equal to a predetermined level, and this point in time may be determined as a second start point of the second voice signal.

When the background energy is measured to be less than the predetermined level for a predetermined period of time t or longer after the second start point of the second voice signal, the control device 30 may determine a point in time at which the background energy is lowered as a second end point of the second voice signal. When the second end point of the second voice signal is detected, the control device 30 may determine that the reception of the first voice signal and the second voice signal is completed, and close the microphone.

Figure 3:
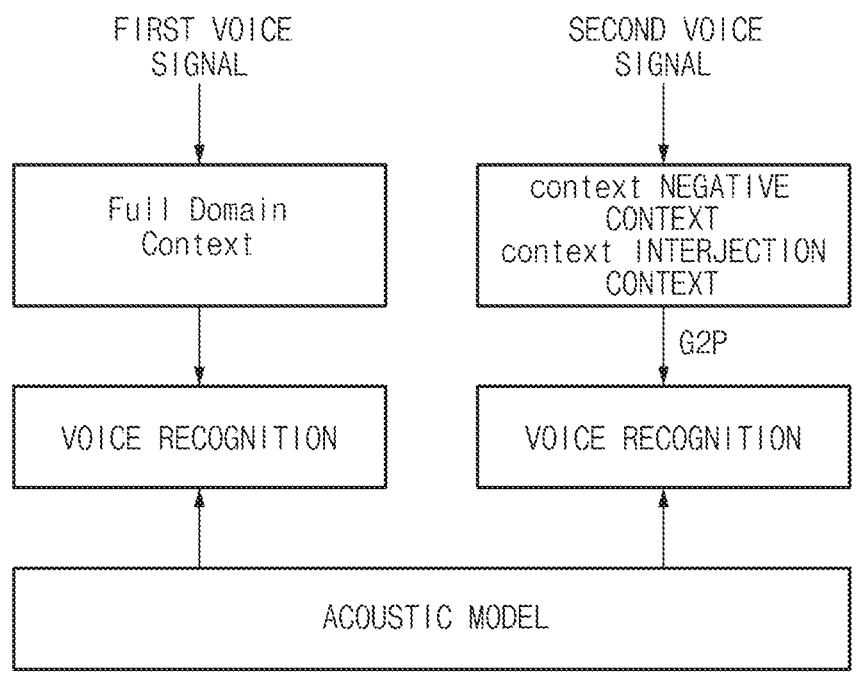
FIG. 3 illustrates a schematic view of voice recognition, according to embodiments of the present disclosure.

As illustrated in FIG. 3, the control device 30 may perform voice recognition on the basis of a full domain context of the received first voice signal and an acoustic model previously stored in the storage device 20. In addition, the control device 30 may perform voice recognition on the basis of any one of a negative context or an interjection context of the second voice signal with respect to the negative interjection and/or the previously stored acoustic model. When a score as a result of recognition of the negative word is sufficiently high, that is, when a recognition result is greater than a threshold, the control device 30 may determine that the negative interjection is recognized.

Figure 4:
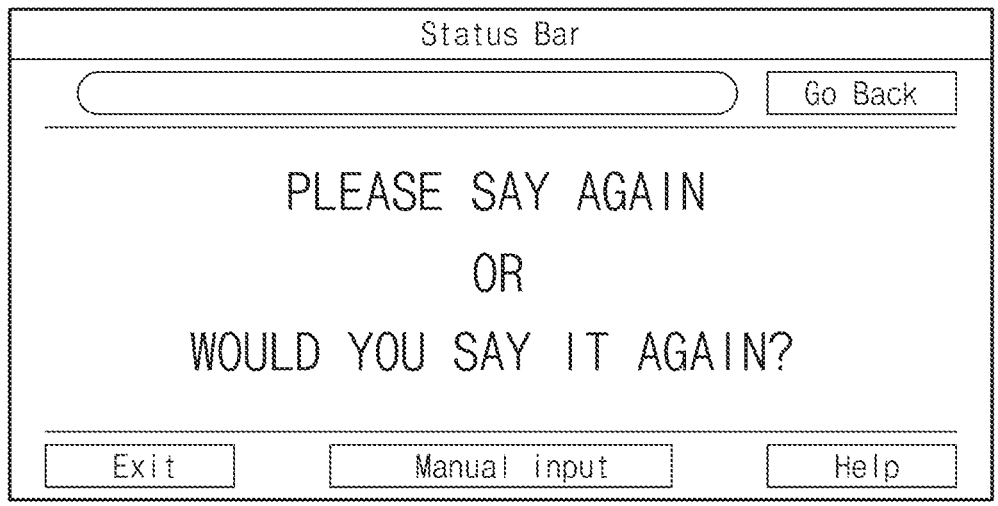
FIG. 4 illustrates a feedback message that is output according to operation of a voice recognition device, according to embodiments of the present disclosure.

According to embodiments of the present disclosure, when it is determined that the negative interjection is recognized from the received second voice signal, the control device 30 may stop searching for the command, and enable the input of a new command. For example, as illustrated in FIG. 4, the control device 30 may control the output device 40 to output a feedback message such as "Please say again" or "Would you say it again?" as either voice or image. Then, when the new command is input, the control device 30 may perform a search with respect to the new command.

Figure 5:
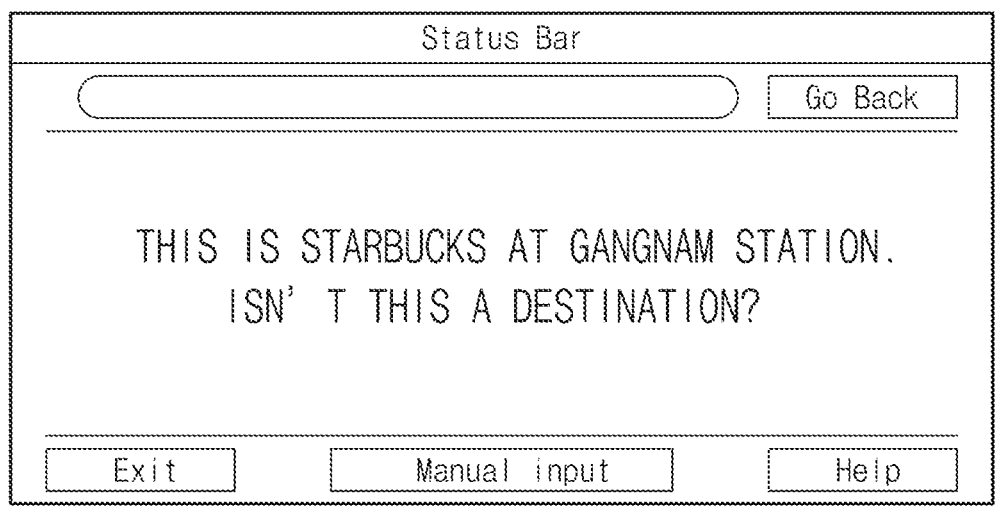
FIG. 5 illustrates a feedback message that is output according to an additional operation of a voice recognition device, according to embodiments of the present disclosure.

In addition, when it is determined that the negative interjection is recognized from the received second voice signal, the control device 30 may generate a search result with respect to the command and a message (hereinafter referred to as the "result determination message") for determining the result. The result determination message may be generated to include a voice recognition scenario for searching for another destination. As illustrated in FIG. 5, for example, the result determination message may be "This is Starbucks at Gangnam station. Isn't this a destination?", and it may be output as either voice or image through the output device 40. After the control device 30 generates the result determination message, when a new command is input, the control device 30 may determine that the search result is wrong. When the new command is input, the control device 30 may perform a search with respect to the new command.

The output device 40 may output a feedback message corresponding to the user's input command as either voice or image. The output device 40 may include a speaker or a display device. The display device may include a liquid crystal display, a thin film transistor-liquid crystal display, an organic light-emitting diode, a flexible display, a 3D display, or an electrophoretic display (EPD). For example, the display device may include a touchscreen, but is not limited to the aforementioned examples.

Figure 6:
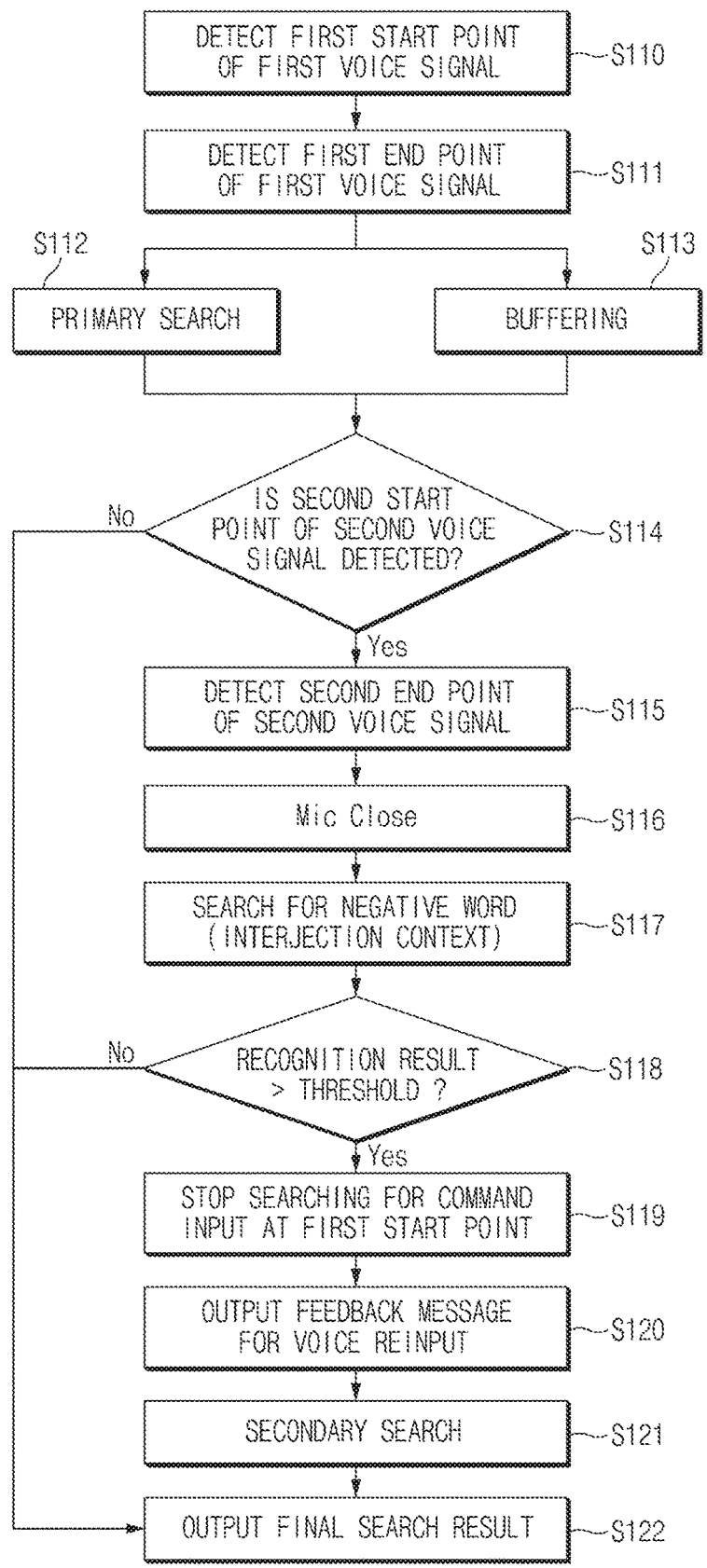
FIG. 6 illustrates a flowchart of a voice recognition method for a vehicle, according to embodiments of the present disclosure.

FIG. 6 illustrates a voice recognition method for a vehicle, according to embodiments of the present disclosure.

First of all, a first start point of a first voice signal received with respect to a voice command uttered by a user may be detected in operation S110. In operation S110, when the user presses a push-to-talk button provided in the interior of the vehicle, or a wake-up command is input, a microphone may be opened such that the first voice signal with respect to the command input to the microphone may be received. When the first voice signal is received, background energy may be measured to be higher than or equal to a predetermined level, and a point in time at which the background energy is increased to be higher than or equal to the predetermined level may be detected as the first start point of the first voice signal. The first voice signal received in operation S110 may be a voice signal with respect to the uttered command.

A first end point of the received first voice signal may be detected in operation S111. In operation S111, when the background energy is measured to be lower than the predetermined level for a predetermined period of time t or longer, a point in time at which the background energy is lowered to be less than the predetermined level may be detected as the first end point of the first voice signal.

When the first end point of the first voice signal is detected, a primary search may be performed to output a result of the uttered command in operation S112. In operation S112, after voice recognition is performed on the first voice signal on the basis of a full domain context and an acoustic model, when it is determined that the voice recognition is completed, the search for the corresponding command may be performed. For example, when a command "Starbucks at Gangnam station" is input and the first voice signal is received in operation S110, the voice recognition may be performed. After the completion of the voice recognition, a search for the location of "Starbucks at Gangnam station" may be performed in operation S112.

While performing operation S112, the voice recognition device may be buffered for an arbitrary time interval in operation S113. In operation S113, after the first end point of the first voice signal is detected, a buffering time may be set to receive a second voice signal even after the first end point. In other words, the voice recognition device may not close the microphone when the end point of the voice signal is detected as in the prior art, but may keep receiving the user's input (e.g., a negative interjection) when the user determines the utterance of a wrong command and utters an interjection containing the context of immediate cancellation. For convenience of explanation, a voice signal received within an arbitrary time interval after the first end point may be referred to as the second voice signal.

Thereafter, it may be determined whether or not a second start point of the second voice signal is detected in operation S114. In operation S114, it may be determined whether or not the second start point is detected by determining whether or not background energy is measured to be higher than or equal to a predetermined level. A point in time at which the background energy is increased to be higher than or equal to the predetermined level may be detected as the second start point of the second voice signal, and when the background energy is greater than or equal to the predetermined level, it may be determined that the second start point of the second voice signal is detected (Yes).

Meanwhile, when the background energy is measured to be lower than the predetermined level, it may be determined that the second voice signal is not received (No). When the second voice signal is not received, operation S122 may be performed to output a message (i.e., final search result) as a result of the search performed in operation S112. For example, when a search for the location of "Starbucks at Gangnam station" is performed in operation S112, the result message "Navigate to Gangnam station" may be output in operation S122.

The second voice signal received in operation S114 may be a voice signal with respect to an interjection. According to embodiments of the present disclosure, the second voice signal received at the second start point may include a voice signal with respect to a negative interjection.

After the second start point of the second voice signal is detected, a second end point may be detected in operation S115. In operation S115, when the background energy is measured to be less than the predetermined level for a predetermined period of time or longer, a point in time at which the background energy is lowered may be detected as the second end point.

When the second end point of the second voice signal is detected, the microphone may be closed in operation S116. In operation S116, it may be determined that the reception of the first voice signal and the second voice signal is completed.

When the reception of the first voice signal and the second voice signal is completed, a search for the negative interjection may be performed to recognize the second voice signal received at the second start point, that is, the voice signal with respect to the negative interjection in operation S117. Voice recognition may be performed on the basis of a negative context and/or an interjection context and/or an acoustic model in operation S117. Then, it may be determined whether or not a recognition result is greater than a threshold in operation S118. When the recognition result is greater than the threshold (Yes) in operation S118, it may be understood that a score as a result of recognition of the negative word is sufficiently high. In this case, it may be determined that the negative interjection is recognized from the second voice signal received at the second start point.

When the recognition result is less than the threshold (No) in operation S118, it may be understood that the score as a result of recognition of the negative word is low, and that the negative interjection is not recognized. Thus, the second voice signal received at the second start point may be ignored, and operation S122 may be performed.

When the recognition result is greater than the threshold (Yes) in operation S118, the search for the command input at the first start point may be stopped in operation S119. Then, a new command may be input in operation S120. A feedback message such as "Please say again" or "Would you say it again?" may be output in operation S120. After operation S120, the user may input a command different from the command input at the first start point. For example, when the command input at the first start point is "Starbucks at Gangnam station", the new command input after operation S120 may be "Starbucks at Sadang station".

A secondary search for the new command input after operation S120 may be performed in operation S121. When the second start point of the second voice signal is detected in operation S114, and the recognition result of the received second voice signal is greater than the threshold, the command input at the first start point may be understood as a wrong command that is uttered mistakenly. Thus, the search for the new command input after operation S120 rather than the command input at the first start point may be performed in operation S121.

The result corresponding to the user's input command may be output as either voice or image in operation S122. The result corresponding to the input command may be a message as a result of the primary search, or may be a message as a result of the secondary search for the new command input after operation S120. For example, in operation S122, the result message with respect to the primary search may be output as "Navigate to Gangnam station", and the result message with respect to the new command input after operation S120 may be output as "Navigate to Sadang station".

Figure 7:
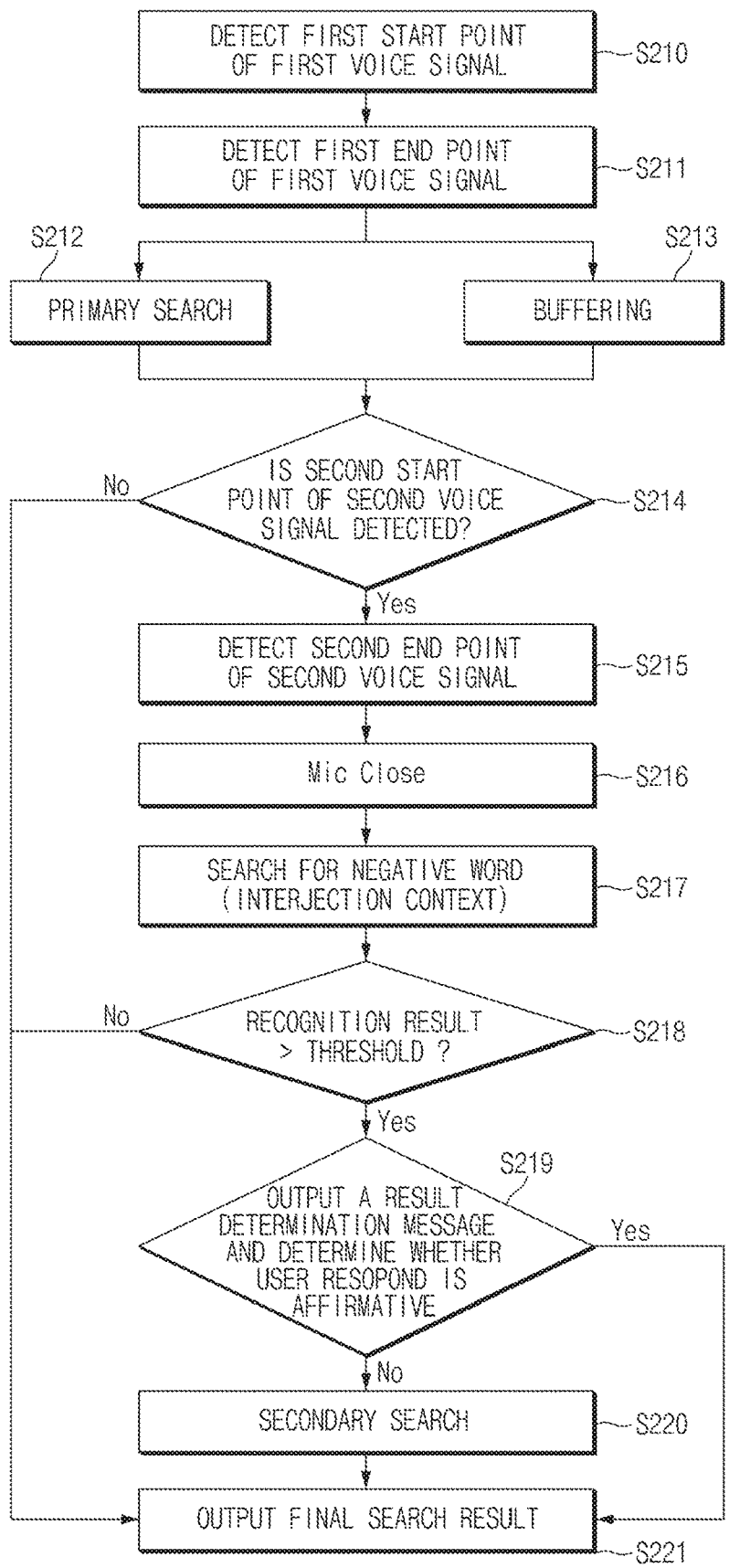
FIG. 7 illustrates an additional flowchart of a voice recognition method for a vehicle, according to embodiments of the present disclosure.

FIG. 7 illustrates a voice recognition method for a vehicle, according to embodiments of the present disclosure.

First of all, a first start point of a first voice signal received with respect to a voice command uttered by a user may be detected in operation S210. In operation S210, when the user presses a push-to-talk button provided in the interior of the vehicle, or a wake-up command is input, a microphone may be opened such that the first voice signal with respect to the command input to the microphone may be received. When the first voice signal is received, background energy may be measured to be higher than or equal to a predetermined level, and a point in time at which the background energy is increased to be higher than or equal to the predetermined level may be detected as the first start point of the first voice signal. The first voice signal received in operation S210 may be a voice signal with respect to the uttered command.

A first end point of the received first voice signal may be detected in operation S211. In operation S211, when the background energy is measured to be lower than the predetermined level for a predetermined period of time t or longer, a point in time at which the background energy is lowered to be less than the predetermined level may be detected as the first end point of the first voice signal.

When the first end point of the first voice signal is detected, a primary search may be performed to output a result of the uttered command in operation S212. In operation S212, after voice recognition is performed on the first voice signal on the basis of a full domain context and an acoustic model, when it is determined that the voice recognition is completed, the search for the corresponding command may be performed. For example, when a command "Starbucks at Gangnam station" is input and the first voice signal is received in operation S210, the voice recognition may be performed. After the completion of the voice recognition, a search for the location of "Starbucks at Gangnam station" may be performed in operation S212.

While performing operation S212, the voice recognition device may be buffered for an arbitrary time interval in operation S213. In operation S213, after the first end point of the first voice signal is detected, a buffering time may be set to receive a second voice signal even after the first end point. In other words, a conventional voice recognition device may not close the microphone when the end point of the voice signal is detected, but may keep receiving the user's input (e.g., a negative interjection) when the user determines the utterance of a wrong command and utters an interjection containing the context of immediate cancellation. For convenience of explanation, a voice signal received within an arbitrary time interval after the first end point may be referred to as the second voice signal.

Thereafter, it may be determined whether or not a second start point of the second voice signal is detected in operation S214. In operation S214, it may be determined whether or not the second start point is detected by determining whether or not background energy is measured to be higher than or equal to a predetermined level. A point in time at which the background energy is increased to be higher than or equal to the predetermined level may be detected as the second start point of the second voice signal, and when the background energy is higher than or equal to the predetermined level, it may be determined that the second start point of the second voice signal is detected (Yes).

Meanwhile, when the background energy is measured to be lower than the predetermined level, it may be determined that the second voice signal is not received (No). When the second voice signal is not received, operation S221 may be performed to output a message (i.e., final search result) as a result of the search performed in operation S212. For example, when a search for the location of "Starbucks at Gangnam station" is performed in operation S212, the result message "Navigate to Gangnam station" may be output in operation S221.

The second voice signal received in operation S214 may be a voice signal with respect to an interjection. According to embodiments of the present disclosure, the second voice signal received at the second start point may include a voice signal with respect to a negative interjection.

After the second start point of the second voice signal is detected, a second end point may be detected in operation S215. In operation S215, when the background energy is measured to be lower than the predetermined level for a predetermined period of time or longer, a point in time at which the background energy is lowered may be detected as the second end point.

When the second end point of the second voice signal is detected, the microphone may be closed in operation S216.

In operation S216, it may be determined that the reception of the first voice signal and the second voice signal is completed.

When the reception of the first voice signal and the second voice signal is completed, a search for the negative interjection may be performed to recognize the second voice signal received at the second start point, that is, the voice signal with respect to the negative interjection in operation S217. Voice recognition may be performed on the basis of a negative context and/or an interjection context and/or an acoustic model in operation S217. Then, it may be determined whether or not a recognition result is greater than a threshold in operation S218. When the recognition result is greater than the threshold (Yes) in operation S218, it may be understood that a score as a result of recognition of the negative word is sufficiently high. In this case, it may be determined that the negative interjection is recognized from the second voice signal received at the second start point.

When the recognition result is less than the threshold (No) in operation S218, it may be understood that the score as a result of recognition of the negative word is low, and that the negative interjection is not recognized. Thus, the second voice signal received at the second start point may be ignored, and operation S221 may be performed.

When the recognition result is greater than the threshold (Yes) in operation S218, a result determination message of a search result with respect to the command input at the first start point may be output and affirmation of user respond may be determined in operation S219. For example, "This is Starbucks at Gangnam station. Isn't this a destination?" may be output as the result determination message. In operation S219, user respond to the result determination message may be determined whether it is affirmative. The user may input an affirmative word or a new command in response to the result determination message. For example, "Yes" or "Starbucks at Sadang station" may be input. In operation S219, when the user respond to the result determination message in the affirmative (Yes), the output result may be determined as that desired by the user. Then, operation S221 may be performed. In operation S219, when the new command is input in response to the result determination message, the output result may be determined as a wrong command that is not desired by the user. When the new command is input, a secondary search for the new command may be performed in operation S220. For example, the secondary search with respect to "Starbucks at Sadang station" may be performed in operation S220.

The result corresponding to the user's input command may be output as either voice or image in operation S221. The result corresponding to the input command may be a message as a result of the primary search, or may be a message as a result of the secondary search for the new command input after operation S219. For example, in operation S221, the result message with respect to the primary search may be output as "Navigate to Gangnam station", and the result message with respect to the new command input after operation S219 may be output as "Navigate to Sadang station".

Figure 8:
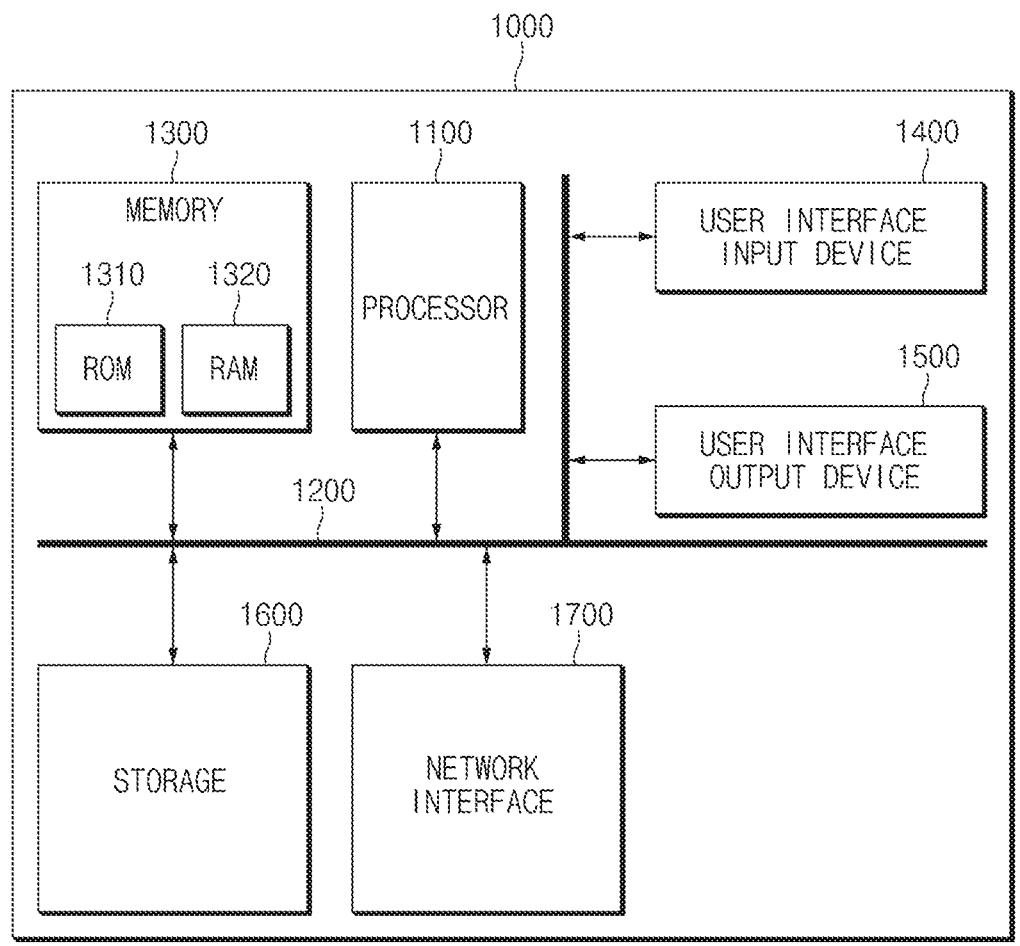
FIG. 8 illustrates the configuration of a computing system by which a method according to embodiments of the present disclosure is executed.

FIG. 8 illustrates the configuration of a computing system by which a method according to embodiments of the present disclosure is executed.

As shown in FIG. 8, a computing system 1000 may include at least one processor 1100, a bus 1200, a memory 1300, a user interface input device 1400, a user interface output device 1500, a storage 1600, and a network interface 1700, wherein these elements are connected through the bus 1200.

The processor 1100 may be a central processing device (CPU) or a semiconductor device processing commands stored in the memory 1300 and/or the storage 1600. The memory 1300 and the storage 1600 include various types of volatile or non-volatile storage media. For example, the memory 1300 may include a read only memory (ROM) and a random access memory (RAM).

Therefore, the steps of the method or algorithm described in connection with the embodiments disclosed herein may be embodied directly in hardware, in a software module executed by the processor 1100, or in a combination thereof. The software module may reside in a storage medium (i.e., the memory 1300 and/or the storage 1600), such as RAM, a flash memory, ROM, an erasable programmable read-only memory (EPROM), an electrically erasable programmable read-only memory (EEPROM), a register, a hard disk, a removable disk, and a CD-ROM. An exemplary storage medium may be coupled to the processor 1100, such that the processor 1100 may read information from the storage medium and write information to the storage medium. Alternatively, the storage medium may be integrated with the processor 1100. The processor 1100 and the storage medium may reside in an application specific integrated circuit (ASIC). The ASIC may reside in a user terminal. Alternatively, the processor 1100 and the storage medium may reside as discrete components in a user terminal.

As set forth above, the voice recognition device and method, according to embodiments of the present disclosure, may provide high accuracy of voice recognition by recognizing negative word(s) (i.e., negative interjection(s)), in a manner such that when the user utters a wrong command, the user is allowed to cancel the input command and utter a new voice command again.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A voice recognition device for a vehicle, comprising:
an input device receiving a command and a negative interjection uttered by a user, converting the command into a first voice signal, and converting the negative interjection into a second voice signal;
a storage device storing at least one of a negative context, an interjection context, and an acoustic model; and
a control device receiving the first voice signal, receiving the second voice signal after receiving the first voice signal, and recognizing the second voice signal based on at least one of the negative context, the interjection context, and the acoustic model when the reception of the first voice signal and the second voice signal is completed.

2. The voice recognition device according to claim 1, wherein the control device receives the second voice signal within an arbitrary time interval after the first voice signal.

3. The voice recognition device according to claim 1, wherein the control device detects a point in time at which background energy of the second voice signal is measured to be greater than or equal to a predetermined level, the detected point in time being start of the second voice signal.

4. The voice recognition device according to claim 1, wherein the control device detects a point in time at which background energy of the second voice signal is measured to be less than a predetermined level, the detected point in time being end of the second voice signal.

5. The voice recognition device according to claim 1, wherein the control device closes the input device when the reception of the first voice signal and the second voice signal is completed.

6. The voice recognition device according to claim 1, wherein the control device determines that the negative interjection is recognized from the second voice signal when a recognition result of the second voice signal is greater than or equal to a threshold.

7. The voice recognition device according to claim 1, wherein the control device performs a primary search with respect to the command after receiving the first voice signal.

8. The voice recognition device according to claim 7, wherein the control device stops the primary search and generates a feedback message that enables input of a new command when a recognition result of the second voice signal is greater than or equal to a threshold.

9. The voice recognition device according to claim 7, wherein the control device generates a result of the primary search and a message for determining the result when a recognition result of the second voice signal is greater than or equal to a threshold.

10. The voice recognition device according to claim 8, wherein the control device generates a result message corresponding to the new command when the recognition result of the second voice signal is greater than or equal to the threshold.

11. A voice recognition method for a vehicle, comprising:
receiving a first voice signal converted from a command uttered by a user;
receiving a second voice signal converted from a negative interjection uttered by the user after receiving the first voice signal; and
recognizing the second voice signal based on at least one of a negative context, an interjection context, and an acoustic model, which are previously stored in a storage device, when the reception of the first voice signal and the second voice signal is completed.

12. The voice recognition method according to claim 11, wherein the receiving of the second voice signal is performed simultaneously with a primary search with respect to the command.

13. The voice recognition method according to claim 11, wherein the receiving of the second voice signal is performed within an arbitrary time interval after the first voice signal is received.

14. The voice recognition method according to claim 11, further comprising detecting a point in time at which background energy of the second voice signal is measured to be greater than or equal to a predetermined level, the detected point in time being start of the second voice signal.

15. The voice recognition method according to claim 11, further comprising detecting a point in time at which background energy of the second voice signal is measured to be less than a predetermined level, the detected point in time being end of the second voice signal.

16. The voice recognition method according to claim 11, wherein the recognizing of the second voice signal comprises determining that the negative interjection is recognized from the second voice signal when a recognition result of the second voice signal is greater than or equal to a threshold.

17. The voice recognition method according to claim 12, further comprising stopping the primary search and outputting a feedback message that enables input of a new command when a recognition result of the second voice signal is greater than or equal to a threshold, after the recognizing of the second voice signal.

18. The voice recognition method according to claim 17, further comprising performing a secondary search with respect to the new command when the new command is input, after the outputting of the feedback message.

19. The voice recognition method according to claim 12, further comprising outputting a result of the primary search and a message for determining the result of the primary search when a recognition result of the second voice signal is greater than or equal to a threshold, after the recognizing of the second voice signal.

20. The voice recognition method according to claim 19, further comprising performing a secondary search with respect to a new command when the new command is input by the user, after the outputting of the result of the primary search and the message for determining the result of the primary search.

* * * * *